United States Patent [19]

Kinoshita

[11] Patent Number: 4,691,282

[45] Date of Patent: Sep. 1, 1987

[54] 16-BIT MICROPROCESSOR SYSTEM

[75] Inventor: Tsuneo Kinoshita, Tokyo, Japan

[73] Assignee: Kabushiki Kaisha Toshiba, Kawasaki, Japan

[21] Appl. No.: 643,386

[22] Filed: Aug. 23, 1984

[30] Foreign Application Priority Data

Aug. 31, 1983 [JP] Japan .............................. 58-159285

[51] Int. Cl.[4] .............................................. G06F 9/30
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,938,096 | 2/1976 | Brown et al. | 364/200 |
| 4,084,228 | 4/1978 | Dufond et al. | 364/200 |
| 4,128,875 | 12/1978 | Thurber et al. | 364/200 |
| 4,385,352 | 5/1983 | Bienvenu | 364/200 |
| 4,481,570 | 11/1984 | Wiker | 364/200 |

Primary Examiner—Eddie P. Chan
Attorney, Agent, or Firm—Cushman, Darby & Cushman

[57] ABSTRACT

A 16-bit microprocessor ($\mu$P) system uses memory access data consisting of: a status field for memory control data including a specific bit; a segment field; and a 16-bit address field. In a $\mu$P, an instruction under execution comprises an $\alpha$ instruction in an operand fetch cycle, an index-modified value of a 16-bit lower logical address is set in an MAR, and a sum of an 8-bit upper logical address word and a carry flag is set in an SGB (Segment Register B). The $\mu$P sets the memory control data having the specific bit of a first logic level in an MCS (Memory Control Status Register), and thereafter generates the memory access data. In this case, the content of the SGB is used for the segment field in place of the segment number stored in an SGA (Segment Register A). When the specific bit of the status field of the memory access data from the $\mu$P, is set at a second logic level, a segment/page table is accessed by the segment field and part (page number) of the address field, thereby generating the page data. A basic address space is accessed by a physical address obtained by linking the page data and the remaining data (displacement) of the address field. On the other hand, when the specific bit is set at the first logic value, a expanded address space is accessed by a physical address obtained by linking the segment field and the address field.

3 Claims, 12 Drawing Figures

16-BIT MICROPROCESSOR SYSTEM

BACKGROUND OF THE INVENTION

The present invention relates to a 16-bit microprocessor system having a 16-bit microprocessor and an external segment/page table to provide an address space exceeding 64 KB (kilobytes) by segment/page processing.

16-bit microprocessors have higher efficiency and better functions than 8-bit microprocessors and are more economical than 32-bit microprocessors. Therefore, 16-bit microprocessors have become widespread and now play a main role in microprocessor systems. However, the systems have a disadvantage in that the size of the address area has an upper limit of $2^{16}$ (i.e., 64 KB). This is because 16-bits are the basic unit of data processing, not only between the 16-bit microprocessor and peripheral devices, but also within the 16-bit microprocessor. In order to solve this problem, a segment or page register can be added to expand the 16-bit address space.

In address calculations such as index modification, the effective addresses are calculated as a modulo-N residue ($N=2^{16}$). However, even if segment/page processing is applied, the address space of 64 KB cannot be widened unless segment/page switching is performed. In other words, in order to obtain an address space exceeding 64 KB by segment/page processing, segment/page switching must be performed.

However, in data processing, storing a great amount of continuous data in graphic or image processing, the segment and page cannot be sequentially switched in accordance with a program. For this reason, it is very difficult to use a 16-bit microprocessor system in graphic or image processing.

Demand has recently arisen for a 16-bit microprocessor system capable of accessing a continous data area exceeding 64 KB without performing segment/page switching. In this case, it is preferable to use a current OS (operating system) to which segment/page processing is applied. This is due to the importance of effectively utilizing widespread software sources such as UNIX as a 16-bit standard OS. UNIX was developed by Bell laboratory (BTL) and serves as an OS for a PDP 11 available from DEC. UNIX is a trademark of the Bell laboratory.

SUMMARY OF THE INVENTION

It is an object of the present invention to provide a 16-bit microprocessor system capable of accessing a continuous data area exceeding 64 KB with a 16-bit microprocessor without performing segment/page switching, and of loading a current program in which segment/page processing has been applied.

In order to achieve the above object of the present invention, there is provided a 16-bit microprocessor system compatible with memory access data consisting of a status field for memory control data, a segment field for segment data, and an address field for a 16-bit effective address. The 16-bit microprocessor system comprises a memory having a basic addressspace and an expanded address space and a 16-bit microprocessor including a memory access data output means for producing memory access data and for supplying the memory access data to an external device thereof when memory access is performed. The memory access data output means produces memory access data in an operand fetch cycle only when the instruction being executed is a specific instruction having a logical address of n bits (n is an integer satisfying a condition n>16). This memory access data comprises a status field having a specific bit which indicates access to the expanded address space among the basic and expanded address spaces, a segment field which indicates the upper (n−16) bits of an n-bit effective address corresponding to the n-bit logical address, and a address field which indicates the remaining 16 bits of the n-bit effective address. The system further comprises a segment/page table and a selecting means. The segment/page table is retrieved in accordance with the segment field and part of the address field of the memory access data, and is accessed to generate page data. The selecting means selects the basic address space or the expanded address space in accordance with the specific bit of the status field. The basic address space is accessed in response to first address data obtained by linking the page data from said segment/page table and the remaining 16 bits of the address field, and the expanded address area is accessed in response to second address data obtained by linking the segment field and address field of the memory access data generated from said memory access data output means.

DESCRIPTION OF THE PREFERRED EMBODIMENT

Figure 1:
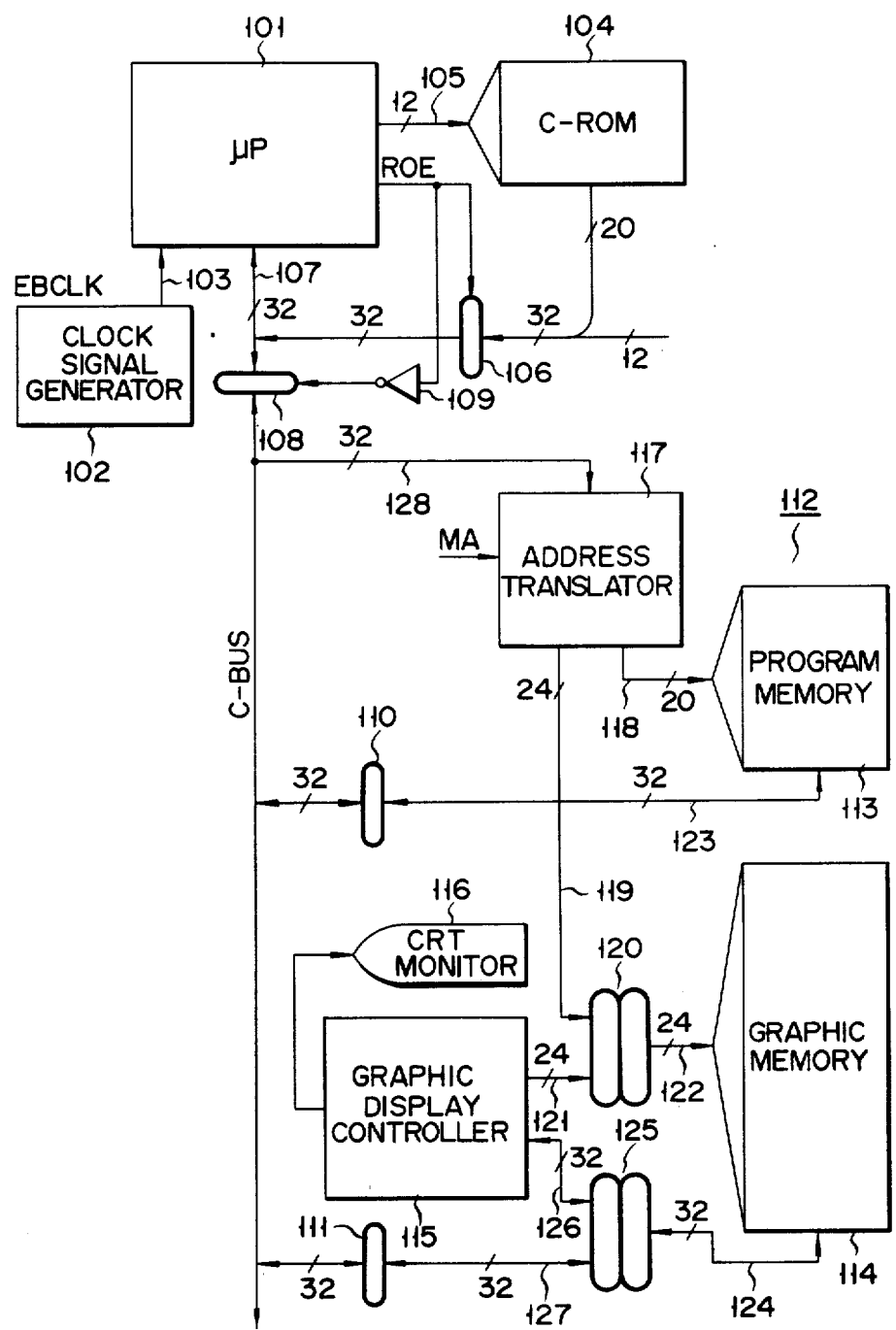
FIG. 1 is a block diagram of a 16-bit microprocessor system according to an embodiment of the present invention.

FIG. 1 shows the overall configuration of a 16-bit microprocessor system according to an embodiment of the present invention. A 16-bit microprocessor ($\mu$P) 101 is connected to a clock signal generator 102 through a signal line 103. The clock signal generator 102 supplies a basic clock signal EBCLK to the $\mu$P 101 through the signal line 103. The μP 101 is also connected to a ROM control memory (to be referred to as a C-ROM hereinafter) 104 through an address line 105. Various microprograms are stored in the C-ROM 104. A microinstruction (20 bits) from the C-ROM 104 is coupled to a set (12 bits) of interruption signals. A combined signal (32 bits) is supplied to a gate 106. The gate 106 is connected to the μP 101 through a common bus (C-BUS) 107.

The C-BUS 107 is the common data transfer path between the μP 101 and the peripheral units, and comprises a 32-bit width. The C-BUS 107 is used to transfer output data (a microinstruction) from the C-ROM 104, memory access data, memory data, input/output data and so on, to be described later. A bidirectional gate 108 is arranged midway along the C-BUS 107. The gate 108 serves to electrically disconnect the portion of the C-BUS 107 opposite to the portion at the side of the μP 101 with respect to the gate 108.

The gate 108 is controlled in response to an output signal from an inverter 109. The output signal from the inverter 109 comprises a level inverted signal of a ROM output enable signal ROE. The signal ROE is generated by the μP 101 and is supplied to the inverter 109 and to the gate 106. The gate 106 is controlled by the signal ROE from the μP 101. The signal ROE is set at logic "1" only during a microinstruction read cycle.

In the microinstruction read cycle, the gate 106 is enabled in response to the signal ROE of logic "1." Data including the output data (microinstruction) from the C-ROM 104 is supplied to the μP 101 through the gate 106 via the C-BUS 107. In this case, the gate 108 is disabled in response to the output (i.e., the level inverted signal of the signal ROE) from the inverter 109. The portion of the C-BUS 107 opposite to the portion at the side of the μP 101 with resepct to the gate 108 is electrically disconnected from the μP 101.

On the other hand, for a period excluding the microinstruction read cycle, the gate 106 is disabled and the gate 108 is enabled. In this case, one of bidirectional gates 110 and 111 arranged at the portion opposite the side of the μP 101 with respect to the gate 108 is enabled through the C-BUS 107. The gates 110 and 111 are used to electrically connect the C-BUS 107 to memory data lines 123 and 127 (to be described later), respectively.

A main memory unit (MMU) 112 has a program memory 113 and a graphic memory 114. The program memory 113 is used to store basic software (OS) such as UNIX and programs under the control of UNIX. The memory area (address space) of the program memory 113 has a size of 1 MB (megabyte). The graphic memory 114 stores graphic data to be displayed by a graphic display controller 115 on a CRT monitor 116. The memory area (address space) of the graphic memory 114 has a size of 16 MB. In this embodiment, the 16 MB address space of the graphic memory 114 is present as an extended address space of 1 MB of the program memory 113. The address data (20 bits) is supplied from an address translator 117 to the program memory 113 through a memory address line 118. The address data (24 bits) is supplied from the address translator 117, or the graphic display controller 115 is supplied to the graphic memory 114. Thus, the address data (24 bits) from the address translator 117 is supplied to a multiplexer 120 through a memory address line 119. The address data (24 bits) from the graphic display controller 115 is supplied to the multiplexer 120 through a memory address line 121. The multiplexer 120 selects one of the memory address lines 119 and 121 and connects the selected line to a memory address line 122 of the graphic memory 114. As a result, one of the address data (24 bits) from the address translator 117 and the graphic display controller 115 is supplied to the graphic memory 114. A memory data line (32 bits) 123 of the program memory 113 is electrically connected to the C-BUS 107 through the gate 110. On the other hand, a memory data line (32 bits) 124 of the graphic memory 114 is connected by a multiplexer 125 to one of the memory data lines (32 bits each) 126 and 127. The memory data line 126 is connected to the graphic display controller 115. The memory data line 127 is electrically connected to the C-BUS 107 through the gate 111.

Figure 2:
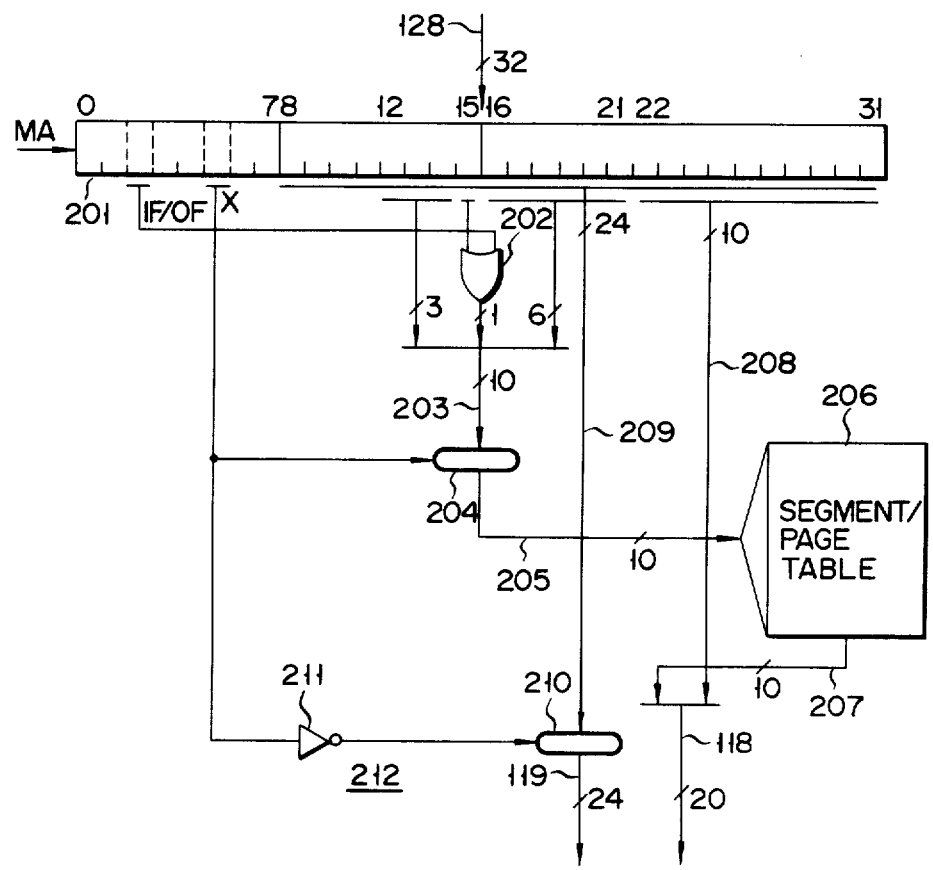
FIG. 2 is a block diagram of an address translator shown in FIG. 1.

The address translator 117 will now be described in detail. FIG. 2 shows the configuration of the address translator 117. As has been shown in FIG. 1, the address translator 117 is connected to the C-BUS 107 through a memory access data line (32 bits) 128. The address translator 117 has a 32-bit latch register 201, as shown in FIG. 2. 32-bit data on the C-BUS 107 shown in FIG. 1 is supplied to the latch register 201 through the memory access data line 128. The latch register 201 latches the 32-bit data on the memory access data line 128 in response to a memory address signal MA. The signal MA is generated by the μP 101 shown in FIG. 1, and designates that the data on the C-BUS 107 is the data (memory access data) concerning the memory access of the MMU 112. Therefore, the latch register 201 latches only the memory access data. This memory access data is supplied from the μP 101 to the C-BUS 107 when the MMU 112 is accessed.

Figure 3:
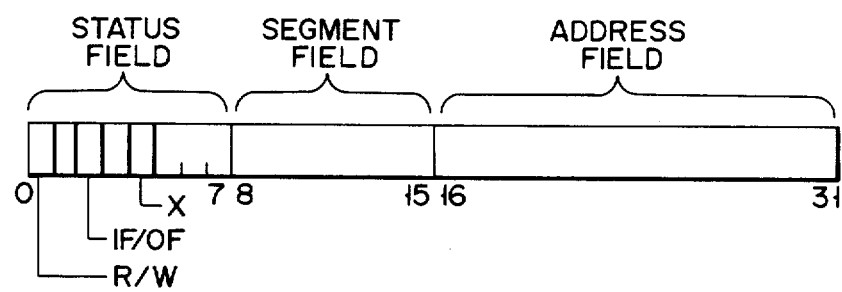
FIG. 3 shows a basic format of memory access data latched by a latch register shown in FIG. 2.

FIG. 3 shows a format of the memory access data. The memory access data comprises an 8-bit status field (bit 0 to bit 7) representing memory control data MCD, an 8-bit segment field (bit 8 to bit 15) and a 16-bit address field (bit 16 to bit 31).

The status field has an IF/OF bit, an R/W bit and an X bit. The IF/OF bit selects either an instruction fetch (IF) or an operand fetch (OF). In this embodiment, when the IF/OF bit is set at logic "1," it selects the instruction fetch. However, when the IF/OF bit is set at logic "0," it selects the operand fetch. The R/W bit selects either a memory read access or a memory write access. The X bit selects access to the program memory 113 or the graphic memory 114. In this embodiment, when the X bit is set at logic "1," the program memory 113 is accessed. However, when the X bit is set at logic "0," the graphic memory 114 is accessed.

The segment field basically represents a segment number SN (the lower four bits are valid). However, when the X bit is set at logic "0," the segment field is used as an expanded field of the address field. In other words, when the graphic memory 114 is accessed, the segment field represents the upper eight bits of a 24-bit operand address OA (effective address).

In principle, the address field represents a 16-bit instruction address IA (effective address) during the instruction fetch cycle. However, the address field represents a 16-bit operand address OA (effective address) during the operand fetch cycle. However, when the X bit is set at logic "0," the address field represents the lower 16 bits of the 24-bit operand address OA.

Referring to FIG. 2 again, the 15th bit and the IF/OF bit (second bit) of the 32-bit memory access data output from the latch register 201 are supplied to an OR gate 202. 10-bit data obtained by linking the 12th to 14th bits of the memory access data, the output from the OR gate 202, and the 16th to 21st bits of the memory access data is supplied to a gate 204 through a signal line 203. The gate 204 is controlled by the X bit of the memory access data. If X=1, the gate 204 is enabled to supply the 10-bit data on the signal line 203 to a segment/page table 206 through a signal line 205.

Figure 4:
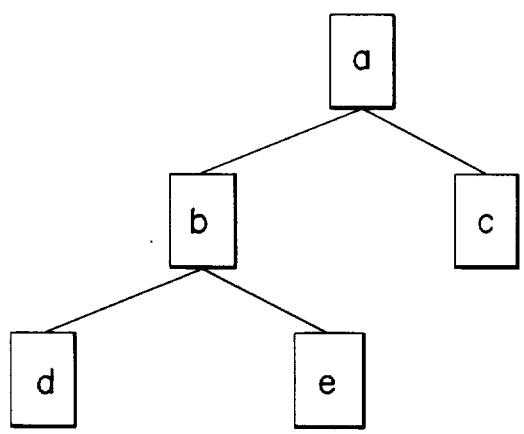
FIG. 4 is a representation showing the hierarchical data structure of UNIX.
Figure 5:
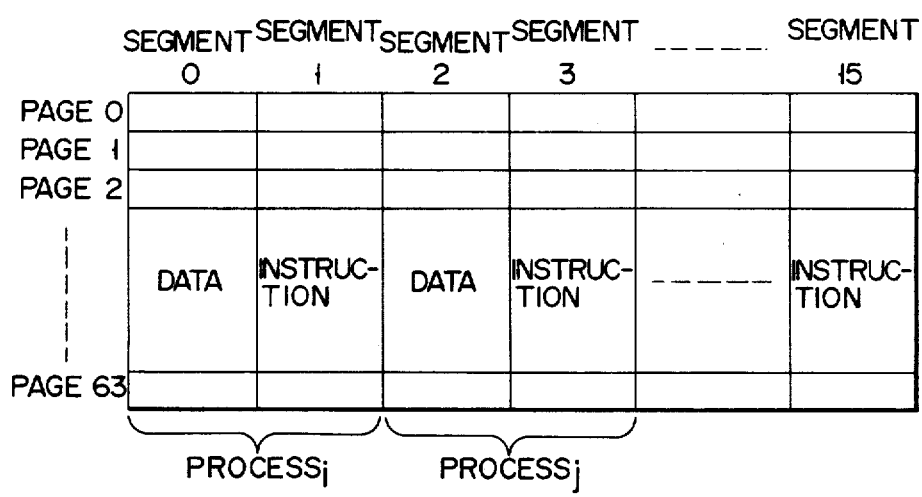
FIG. 5 is a table for explaining the relationship between a segment/page table shown in FIG. 2 and the instruction and data parts of UNIX.

The segment/page table 206 will be described. As shown in FIG. 4, the data structure of UNIX comprises a tree of memory blocks each having a predetermined size (1 KB in this embodiment). The root block connected to the group of other blocks is called a root segment. The segment/page table 206 is arranged to connect memory blocks of 1 KB in a tree-like manner and allocate the memory blocks at physical addresses. In UNIX, a pair of an instruction part and data part is normally assigned to one process (corresponding to a task). As shown in FIG. 5, the respective processes are assigned to the segment/page table 206. In this embodiment, the address space (logical address space) of 1 MB consists of 16 segments. One segment consists of 64 pages, and the memory size of one page is 1 KB. the instruction and data parts of the respective processes are assigned to odd segments (to be referred to as instruction segments hereinafter) and even segments (to be referred to as data segments hereinafter). The segment/page table 206 shows the correspondence between the respective pages in each segment and the 1 KB area in the physical address area (the memory area of 1 MB of the program memory 113). In other words, the segment/page table 206 shows the correspondence of 10-bit data consisting of a segment number SN (4 bits) and a page number PN (6 bits), and a 10-bit page frame number PFN (page data).

Referring to FIG. 2 again, the segment/page table 206 is accessed in response to 10-bit data supplied through the signal line 205. This 10-bit data comprises data obtained by linking the 12th to 14th bits of the memory access data, the logical sum of the IF/OF bit and the 15th bit, and the 16th to 21st bits. The 12th to 15th bits (the lower four bits of the segment field) constitute the segment number SN, if X=1. In this case, the 15th bit is set at logic "0." If X=1, the 12th to 15th bits indicate a start segment (even segment) of two consecutive segments assigned to each process. By using the output (logical sum of the IF/OF bit and the 15th bit) from the OR gate 202 instead of the 15th bit, one process can be divided into an instruction segment and a data segment. If X=1, the 16th to 21st bits indicate the page number PN.

As is apparent from the above description, the 10-bit data is the linked data of the segment number SN and the page number PN. Therefore, when this 10-bit data is supplied to the segment/page table 206, the corresponding page frame number PFN (10-bit data) is read out from the table 206 and appears on a signal line 207. The page frame number PFN on the signal line 207 is linked with the 22nd to 31st bits supplied from the latch register 201 through a signal line 208, and the linked data is supplied to the memory address line 118 (of the program memory 113). If X=1, the 22nd to 31st bits indicate a displacement DISP within the page. Therefore, the data on the memory address line 118 indicates a physical address (first address data) for addressing the program memory 113. The gate 204 may be arranged between the signal lines 207 and 208, and the memory address line 118.

Figure 6:
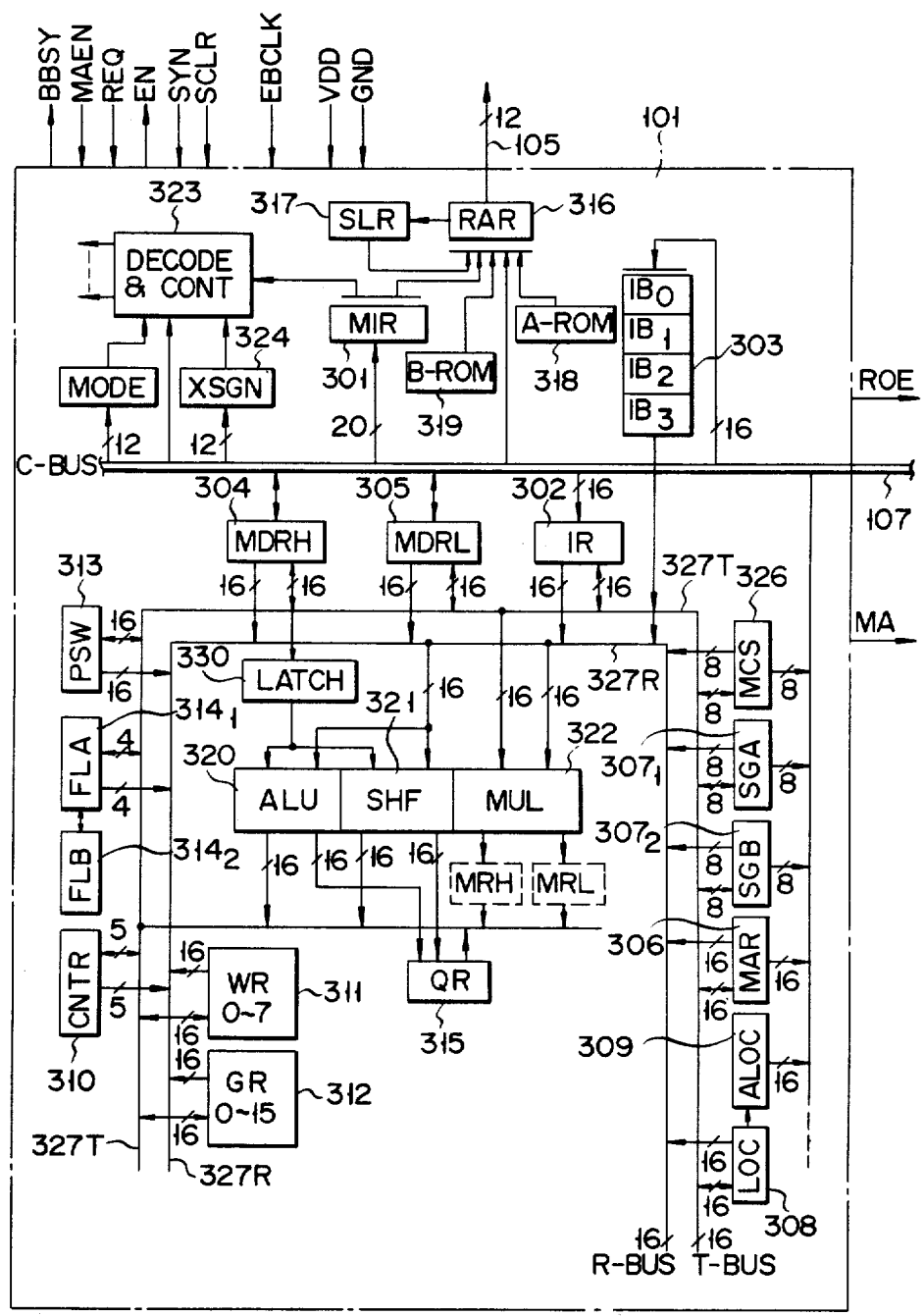
FIG. 6 is a block diagram of a microprocessor ($\mu$P) shown in FIG. 1.

In order to describe the production of the memory access data latched by the latch register 201, the $\mu$P 101 for generating this data will first be described. In a preferred embodiment, the $\mu$P 101 comprises a 16-bit microprocessor T88000 available from Toshiba Corporation (Japan). FIG. 6 shows the internal configuration of the $\mu$P 101. The $\mu$P 101 has a total of 64 terminals including the 32-bit C-BUS (107) terminals, and 12-bit ROM address line (105) terminals connected to external circuits. The function logic of the $\mu$P 101 is given as follows:

(1) MIR (Microinstruction Register) 301

The MIR 301 comprises a 20-bit register for storing a microinstruction. The microinstruction is read out from the C-ROM 104 and is supplied to the MIR 301 through the C-BUS 107.

(2) IR (Instruction Register) 302

The IR 302 comprises a 16-bit register for storing a currently executed user instruction. The user instruction is supplied from an $IB_{0-3}$ (instruction buffer) 303 to be described below.

(3) $IB_{0-3}$ (Instruction Buffer) 303

The $IB_{0-3}$ 303 comprises a 4 (words)×16 bit buffer register for storing a user instruction prefetched from the program memory 113. In the $\mu$P 101, the content of the $IB_{0-3}$ 303 can be supplied to a T-, R-BUS 327T, or 327R (to be described in detail later) in response to the microinstruction. However, the data on the T-BUS 327T and the R-BUS 327R cannot be written in the $IB_{0-3}$ 303. The user instruction is written in the $IB_{0-3}$ 303 through the C-BUS 107.

(4) MDRH (Memory Data Register High) 304

The MDRH 304 comprises a 16-bit register for storing the upper 16 bits of the 32-bit data on the C-BUS 107. In the $\mu$P 101, the data on the C-BUS 107 and the T-BUS 327T can be set in the MDRH 304. The content of the MDRH 304 can be supplied onto the C-BUS 107, the T-BUS 327T or the R-BUS 327R.

(5) MDRL (Memory Data Register Low) 305

The MDRL 305 comprises a 16-bit register for storing the lower 16 bits of the 32-bit data on the C-BUS 107. In the $\mu$P 101, the data on the C-BUS 107 and the T-BUS 327T can be set in the MDRL 305. The content of the MDRL 305 can be supplied onto the C-BUS 107, the T-BUS 327T or the R-BUS 327R.

(6) MAR (Memory Address Register) 306

The MAR 306 comprises a 16-bit register for storing the operand address OA (effective address) of the MMU 112 and has a counter function.

(7) SGA (Segment Register A) $307_1$, SGB (Segment Register B) $307_2$

The SGA $307_1$ and the SGB $307_2$ are 16-bit registers for expanding the logical address space, respectively. They store mainly data (segment number SN) for specifying the segments. The content of the SGA $307_1$ (or SGB $307_2$) is used together with the content of the MAR 306 or an ALOC (Advanced Location Counter) 309 (to be described later) to create a physical address. The physical address is normally created by using the SGA $307_1$. When the instruction comprises a specific instruction, the SGB $307_2$ is temporarily used. In this embodiment, the SGB $307_2$ is used to store the upper 8 bits of the 24-bit operand address OA when the graphic memory 114 is accessed.

(8) LOC (Location Counter) 308

The LOC 308 comprises a 16-bit register for storing a user instruction address and has a counter function. The LOC 308 is increased by two every time the user instruction is fetched and stores the next user instruction address.

(9) ALOC (Advanced Location Counter) 309

The ALOC 309 comprises a 16-bit register for storing an address of the next user instruction read out from the UNIX memory 113 in the MMU 112. The content of the ALOC 309 advances by two or four from the address indicated by the LOC 308 so as to perform prefetching.

(10) CNTR (Counter Register) 310

The CNTR 310 comprises an 8-bit binary down counter used for loop counting, multiplication/division, shifting or the like.

(11) $WR_{0-7}$ (Working Register) 311

The $WR_{0-7}$ 311 comprises eight 16-bit registers for storing the intermediate results of calculations in accordance with microprograms. The $WR_{0-7}$ 311 can be directly accessed as source and destination registers.

(12) $GR_{0-15}$ (General Register) 312

The $GR_{0-15}$ 312 comprises sixteen 16-bit registers and serves as an accumulator and an index register. The $GR_{0-15}$ 312 is accessed by the user instruction.

(13) PSW (Program Status Word) 313

The PSW 313 comprises a 16-bit register for storing an execution status of the user program.

(14) FLA (Flag Register A) $314_1$, FLB (Flag Register B) $314_2$

The FLA $314_1$ and the FLB $314_2$ comprise 4-bit registers for storing the states of arithmetic and logic operations of an ALU (Arithmetic and Logic Unit) 320, respectively.

(15) QR (Quotient Register) 315

The QR 315 comprises a 16-bit register as an auxiliary register for the ALU 320 and an SHF (Shifter) 321.

(16) RAR (ROM Address Register) 316

The RAR 316 comprises a 12-bit register for storing an address of the next microinstruction to be read out from the C-ROM 104. The content (microinstruction address) of the RAR 316 is supplied to the C-ROM 104 through the 12-bit ROM address line 105. The RAR 316 has a counter function for incrementing the count by one every time the microinstruction is read out.

(17) SLR (Subroutine Link Register) 317

The SLR 317 comprises a 12-bit register for storing a return address when a subroutine is started in a microprogram.

(18) A-ROM (Internal ROM-A) 318

The A-ROM 318 stores a start address of the microprogram to be executed after the system clear, or a start address of the microprogram to be restarted after interrupt detection. The A-ROM 318 has a memory capacity of 2 (words) × 12 bits.

(19) B-ROM (Internal ROM-B) 319

The B-ROM 319 serves as a correspondence table for storing an address corresponding to an address for a microprogram accessible in response to an operation code OP of the user instruction. The B-ROM 319 has a memory capacity of 256 (words) × 12 bits. The B-ROM 319 stores the address corresponding to the address of the C-ROM 104 which is accessible in response to the operation code OP of the user instruction stored in the IR 302. At each address of the B-ROM 319, decision data is stored which is used to determine whether the microprogram corresponding to the operation code OP is ended in one or more steps, or whether the microprogram corresponding to the operation code OP is regarded as an illegal instruction. When the microprogram is ended in one step, the corresponding microprogram (microinstruction) is stored at the address of the C-ROM 104 which corresponds to the address of the B-ROM 319. When the microprogram requires two or more steps, the first-step microinstruction is stored at the address of the C-ROM 104. When the microprogram requires two or more steps, the B-ROM 319 stores an address data corresponding to the address (microinstruction address of the C-ROM 104) at which the second-step microinstruction is stored.

(20) ALU (Arithmetic and Logic Unit) 320

The ALU 320 comprises a combined logic circuit for performing 16-bit parallel arithmetic and logic operations and includes a one-digit (decimal) adder/subtractor. In the $\mu P$ 101, the operation data from the R-BUS 327R is directly supplied to the ALU 320, and the operation data from the T-BUS 327T is latched by a LATCH 330 and is then supplied to the ALU 320. The calculated result of the ALU 320 is supplied to the T-BUS 327T.

(21) SHF (Shifter) 321

The SHF 321 comprises a hardware shifter for performing a shift to the right or left by 1 to 15 bits in one cycle.

(22) MUL (Multiplier) 322

The MUL 322 comprises a 16×16 bits high-speed multiplier.

(23) DECODE & CONT (Decoder and Controller) 323

The DECODE & CONT 323 decodes the microinstruction stored in the MIR 301 and generates various control signals such as the signals ROE and MA. The DECODE & CONT 323 has a function for generating internal clocks in accordance with the basic clock signal EBCLK from the clock signal generator 102 connected to the $\mu P$ 101. The DECODE & CONT 323 receives a set of interruption signals from an XSGN (External Signal Register) 324 to be described below.

(24) XSGN (External Signal Register) 324

The XSGN 324 comprises a 12-bit register for storing the set of interruption signals which have been supplied to the C-BUS 107 through the gate 106 together with the microinstruction read out from the C-ROM 104.

(25) MCS (Memory Control Status Register) 326

The MCS 326 comprises an 8-bit register for storing the memory control data MCD (see the status field in FIG. 3) generated from the DECODE & CONT 323. The content of the MCS 326 is sent together with the contents of the MAR 306 (or ALOC 309) and the SGA $307_1$ (or SGB $307_2$) to external devices through the C-BUS 107.

(26) T-BUS (Transfer Bus) 327T, R-BUS (Receiver Bus) 327R

The T-BUS 327T comprises a 16-bit internal bus for bidirectional data transfer, and the R-BUS 327R comprises a 16-bit internal bus for unidirectional data transfer. The T-BUS 327T and the R-BUS 327R serve to transfer data between the registers inside the $\mu P$ 101.

The generation of the memory access data by the $\mu P$ 101 having the internal configuration described above, and the access of the MMU 112 in accordance with the memory access data will be described with reference to FIGS. 7 to 12.

When the MMU 112 is accessed, the $\mu 101$ generates proper memory access data (32 bits) by detecting whether the fetch cycle is in the instruction fetch cycle or the operand fetch cycle, and, if the fetch cycle is detected as the operand fetch cycle, whether an instruction to be executed is an $\alpha$ instruction or a $\beta$ instruction.

The α instruction is a new instruction for accessing the graphic memory 114 in the MMU 112. On the other hand, the β instruction is a normal instruction for accessing the data part of the program memory 113 in the MMU 112. Unlike the β instruction, the α instruction does not require segment/page processing, as will be described in detail later.

Figure 7:
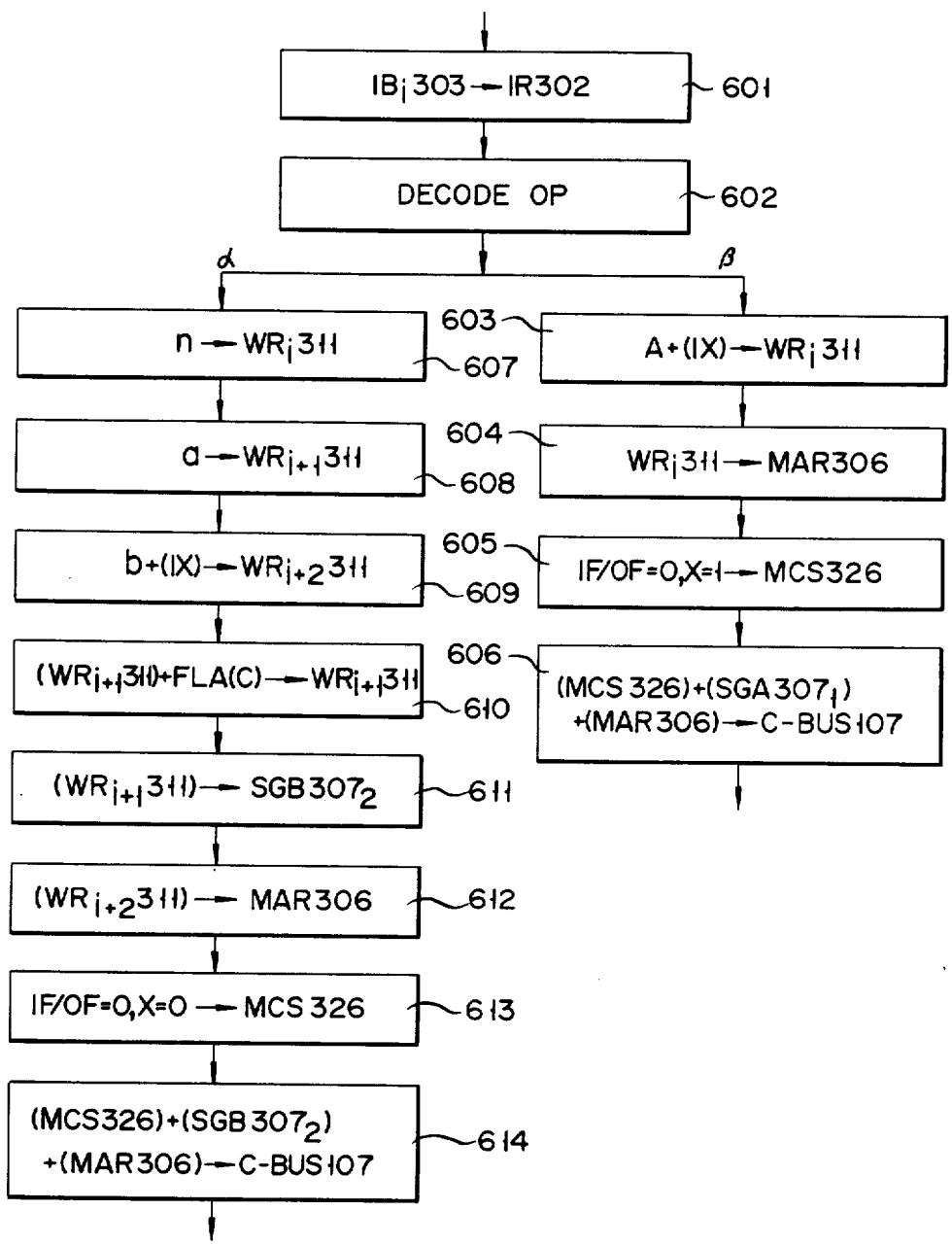
FIG. 7 is a flow chart showing data producing steps in the microprocessor.

As shown in the flow chart of FIG. 7, a user instruction (first half word) to be executed is read out from the $IB_i$ 303 (one of the $IB_{0-3}$ 303) and is loaded in the IR 302 (step 601). The operation code OP of the user instruction is decoded in step 602. User instruction decoding is a translation of the microprogram (an array of microinstructions) for executing the user instruction. More specifically, the operation code OP included in the user instruction loaded in the IR 302 is set in the RAR 316, and the content (operation code OP) of the RAR 316 is supplied to the C-ROM 104 through the ROM address line 105 so as to access the address of the start microinstruction of the corresponding microinstructions. The microprogram corresponding to the user instruction loaded in the IR 302 can then be executed.

Figure 8:
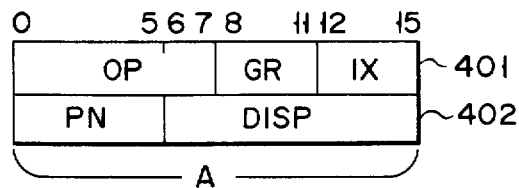
FIG. 8 shows a format of a $\beta$ type instruction applied to the microcomputer system shown in FIG. 1.

Assume that the user instruction loaded in the IR 302 is a β instruction. The β instruction comprises a two-half word (one word) instruction consisting of a first half word 401 and a second half word 402, as shown in FIG. 8. The first half word (16 bits) 401 consists of the 8-bit operation field OP (operation code OP), a 4-bit destination register field GR (general register designation field) and a 4-bit index register field IX. The second half word 402 comprises a 16-bit logical address field A. The logical address field A consists of the 6-bit page number PN and a 10-bit displacement DISP.

In the μP 101, when the user instruction loaded in the IR 302 is the β instruction, the content (second half word 402) of the field A of this instruction is added to the content (IX) of the index register accessed by the field IX. A sum A+(IX) is stored in $WR_i$ 311 (one of the $WR_{0-7}$ 311) (step 603). The processing content of step 603 is described in more detail below. In step 603, the second half word 402 as one of the components of the β instruction is read out from the $IB_{i+1}$ 303 (one of the $IB_{0-3}$ 303) and is supplied to the ALU 320. At the same time, the content of the index register accessed by the index register field IX in the β instruction (first half word 401) loaded in the IR 302 is also supplied to the ALU 320. The second half word 402 (i.e., the logical address field A) and the content (IX) of the index register field IX are added by the ALU 320. A summed result, i.e., an index-modified 16-bit operand address OA (effective address) of the ALU 320 is stored in the $WR_i$ 311 through the T-BUS 327T. The index register IX is constituted by part of the $GR_{0-15}$ 312.

After step 603, the address A+(IX) stored in the $WR_i$ 311 is read out onto the T-BUS 327T and is loaded in the MAR 306 in step 604. 8-bit memory control data MCD having the X bit of logic "1" and the IF/OF bit of logic "0" is set in the MCS 326 in step 605.

The μP 101 sends out onto the C-BUS 107 the memory access data (32 bits) obtained by linking the content (MCD) of the MCS 326, the content of the SGA $307_1$ and the content of the MAR 306 when the instruction being executed comprises the β instruction in the operand fetch cycle (operand access) in step 606. At the same time, the μP 101 generates the memory address signal MA. The above operation is performed under the control of the DECODE CONT 323 in accordance with the microprogram (in the C-ROM 104) corresponding to the instruction loaded in the IR 302. The SGA $307_1$ stores an 8-bit segment number SN whose lower four bits are effective and LSB is set at logic 0.

Figure 9:
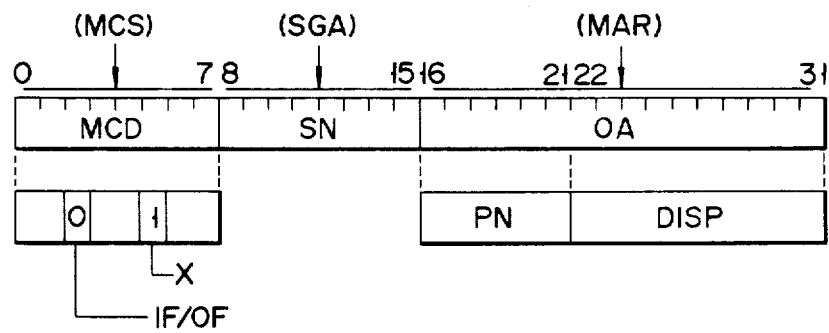
FIG. 9 shows the contents of the memory access data latched by the latch register of FIG. 2 when the executed instruction comprises the $\beta$ type instruction in the operand fetch cycle.

The memory access data on the C-BUS 107 is supplied to the latch register 201 in the address translator 117 through the memory access data line 128. The latch register 201 also receives the signal MA as a latch timing signal from the μP 101. As a result, the memory access data from the μP 101 is latched by the latch register 201. In this case, the content (memory access data) of the latch register 201 is as shown in FIG. 9.

When the memory access data having the X bit of logic "1" and the IF/OF bit of logic "0" is latched by the latch register 201, the physical address (20 bits) for accessing the data part of the program memory 113 in the MMU 112 is generated by the address translator 117 in accordance with the content of the latch register 201. The physical address from the address translator 117 is supplied to the program memory 113 through the memory address line 118, thereby accessing the data part of the program memory 113. The detailed operation for generating the physical address by the address translator 117 has already been described and will not be repeated.

Figure 10:
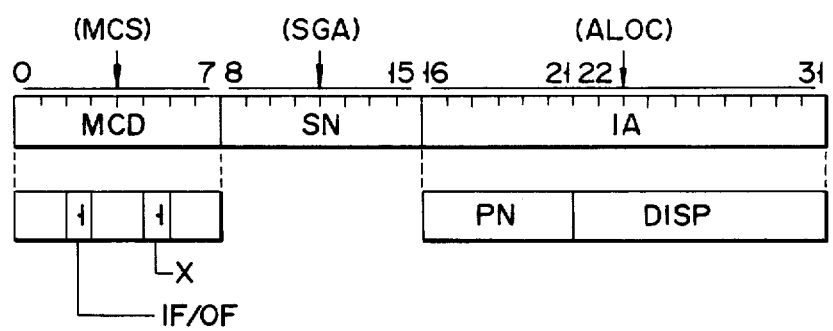
FIG. 10 shows the contents of the memory access data latched by the latch register in the instruction fetch cycle.

The μP operation for accessing the instruction part of the program memory 113 in the instruction fetch cycle will be described by exemplifying the case of program branching. In this case, the μP 101 updates the contents of the LOC 308 and ALOC 309 to the effective branch address. The μP 101 also causes the MCS 326 to store 8-bit memory control data MCD having the X bit of logic "1" and the IF/OF bit of logic "1." The μP 101 then supplies onto the C-BUS 107 data (32 bits) obtained by linking the content (MCD) of the MCS 326, the content of the SGA $307_1$ and the content of the ALOC 309. This memory access data is latched by the address translator 117 in response to the signal MA from the μP 101 in the same manner as in the operand fetch cycle. The content of the latch register 201 is shown in FIG. 10.

When the memory access data having the X bit of logic "1" and the IF/OF bit of logic "1" is latched by the latch register 201, the physical address for accessing the instruction part of the program memory 113 is produced in accordance with the content of the latch register 201. The instruction part of the program memory 113 is accessed in accordance with the physical address, and the branch destination instruction is fetched. When instruction prefetch is performed, the same operation as in the branch destination instruction retrieval is performed, except that the current content of the ALOC 309 is used without modification. The normal operand fetch is performed for the $IB_i$ 303 corresponding to the content (e.g., lower two bits) of the LOC 308.

In the above embodiment, the $GR_{0-15}$ 312 is not used as a segment register, and no means is provided to access the segment register during the user instruction execution. This is because no room is left to arrange the segment register field in the user instruction in the 16-bit microprocessor system. For this reason, in general, as shown in this embodiment, a specific segment register (e.g., the segment register SGA $307_1$) is arranged and is automatically accessed on the microprogram level. The content of the segment register (SGA $307_1$) can be updated by execution of the specific instruction. However, when a large continuous memory area is accessed, it is almost impossible to sequentially update the contents of the segment register $307_1$ by detecting a change in segment from the viewpoint of software. In order to solve this problem, operand fetch by the α instruction is performed.

Assume that the user instruction loaded in the IR 302 comprises an α instruction. The α instruction comprises a three-half word instruction consisting of a first half word 501, a second half word 502 and a third half word 503, as shown in the data format of FIG. 11. The first half word (16 bits) 501 consists of an 8-bit operation field OP (the operation code OP), a 4-bit destination register field GR (general register designation field) and a 4-bit index register field IX. The second half word (16 bits) 502 consists of an 8-bit transfer byte number designation field n and an 8-bit upper operand address field a. The third half word (16 bits) 503 comprises a 16-bit lower operand address field b. In this embodiment, the 24-bit operand address (logical address) is divided into upper eight bits and lower 16 bits which are respectively included in the second and third half words 502 and 503.

In the μP 101, when the user instruction loaded in the IR 302 comprises the α instruction, the content of the transfer byte number designation field n of the second half word 502 as one of the components of this instruction is read out from the $IB_{i+1}$ 303 (one of the $IB_{0-3}$) and is stored in the $WR_i$ 311 (one of the $WR_{0-7}$) (step 607). The content of the upper operand address field a of the second half word 502 is read out from the $IB_{i+1}$ and is stored in the $WR_{i+1}$ 311 (one of the $WR_{0-7}$) (step 608).

The content (third half word 503) of the field b of the corresponding α instruction is added to the content (IX) of the index register accessed by the field IX, and a sum B+(IX) (16 bits) is stored in $WR_{i+2}$ 311 (one of the $WR_{0-7}$ 311) (step 609). The processing contents of the step 609 will be described in more detail below. In step 609, the third half word 503 as one of the components of the corresponding α instruction is read out from the $IB_{i+2}$ 303 (one of the $IB_{0-3}$) and is supplied to the ALU 320. In this case, the content (IX) of the index register specified by the index register field IX in the first half-word 501 in the α instruction loaded in the IR 302 is also supplied to the ALU 320. The third half word 503 (lower operand address field b) and the content (IX) are added by the ALU 320. A sum, i.e., the index-modified 16-bit lower address (lower effective address), from the ALU 320 is stored in the $WR_{i+2}$ 311 through the T-BUS 327T. A flag bit (carry flag) C for representing the presence or absence of a carry in the calculated result from the ALU 320 is set in a predetermined bit position in the FLA $314_1$.

After step 609, the content (8 bits) of the upper operand address a stored in the $WR_{i+1}$ is added to the flag bit (one bit) C stored in the FLA $314_1$. The sum thereof, which is an 8-bit upper address (upper effective address), is stored in the $WR_{i+1}$ 311 through the T-BUS 327T (step 610).

In step 610, the 8-bit upper address stored in the $WR_{i+1}$ 311 is read out onto the T-BUS 327T and is loaded in the SGB $307_2$ (step 611). After step 611, the 16-bit lower address stored in the $WR_{i+2}$ 311 is read out onto the T-BUS 327T and is loaded in the MAR 306 (step 612). The 8-bit memory control data MCD having the X bit of logic "0" and the IF/OF bit of logic "0" is set in the MCS 326 (step 613).

When the instruction being executed comprises the α instruction, the μP 101 generates onto the C-BUS 107 the data (32 bits) as memory access data obtained by linking the content (MCD) of the MCS 326, the content of the SGB $307_2$ and the content of the MAR 306 in the operand fetch cycle (operand access) (step 614). At the same time, the μP 101 generates a memory address signal MA. The above operation is performed under the control of the DECODE CONT 323 in accordance with the microprogram (in the C-ROM 104) corresponding to the α instruction loaded in the IR 302.

Figure 12:
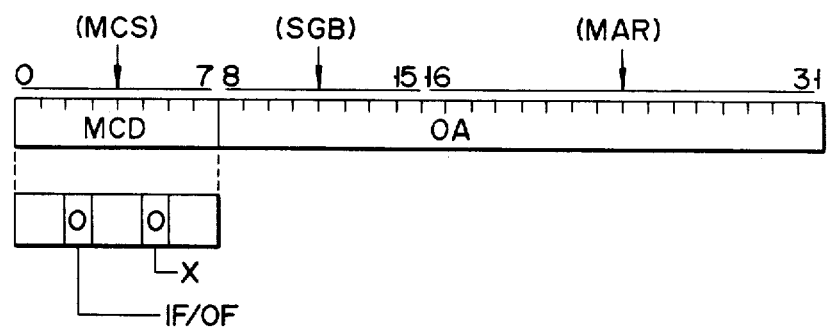
FIG. 12 shows the contents of the memory access data latched by the latch register of FIG. 2 when the executed instruction comprises the $\alpha$ type instruction in the operand fetch cycle.

The memory access data on the C-BUS 107 is supplied to the latch register 201 in the address translator 117 through the memory access data line 128 and is latched by the latch register 201 in response to the memory address signal MA. In this case, the content of the latch register 201 is illustrated in FIG. 12. As is apparent from the above description, the 8th to 15th bits (segment field) of the latch register 201 latch the upper 8-bit data (the content of the SGB $307_2$) of the 24-bit operand address OA (effective address). Similarly, the 16th to 31st bits (address field) of the latch register 201 latch the remaining 16 bits (the content of the MAR 306) of the 24-bit operand address OA. In this embodiment, the 24-bit operand address OA (obtained by linking the content of the SGB $307_2$ and the content of the MAR 306), i.e., the address represented by $a \times 2^{16} + b + (IX)$, is used as the physical address for accessing the graphic memory 114 in the MMU 112.

The contents (24-bit operand address OA) of the 16th to 31st bits of the latch register 201 are supplied to a gate 210 through a signal line 209. The X bit in the memory control data MCD as the contents of the 0 to 7 bits of the latch register 201 is supplied to the gate 210 through an inverter 211. In this embodiment, if X=0, the gate 210 is enabled to gate the data (24 bits) from the signal line 209 to the memory address line 119. The gate 210, the gate 204 and the inverter 211 constitute a selector 212 for selecting one of access operations of the program memory 113 and the graphic memory 114.

As shown in FIG. 1, the memory address line 119 is connected to the multiplexer 120. The memory address line 121 is also connected between the graphic display controller 115 and the multiplexer 120. The multiplexer 120 electrically connects one of the memory address lines 119 and 121 to the memory address line 122 of the graphic memory 114. Assume that the multiplexer 120 connects the memory address line 119 to the memory address line 122 of the graphic memory 114. In this case, the 24 bit address data represented by $a \times 2^{16} + b + (IX)$ on the memory address line 119 is supplied to the memory address line 122 through the multiplexer 120. The graphic memory 114 is thus accessed in accordance with this address. Selection of the program memory 113 and the graphic memory 114 is performed in accordance with the logic status of the X bit. More specifically, if X=1, the program memory 113 is selected. Otherwise, the graphic memory 114 is selected in the same manner as described above.

According to this embodiment, by using the α instruction, the graphic memory 114 having the physical address space of 16 MB can be accessed without performing segment/page processing in accordance with the program stored in the program memory 113. According to this embodiment, even if a 16-bit microprocessor system is used, a large continuous data area exceeding the capacity of 64 KB can be accessed without performing segment/page switching. In addition, a program memory subjected to segment/page processing can also be accessed so as to utilize software such as the UNIX.

Figure 11:
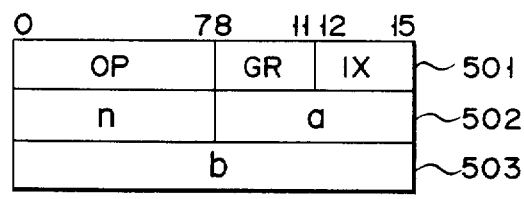
FIG. 11 shows a format of an $\alpha$ type instruction applied to the system shown in FIG. 1.

The data transfer by the α instruction will be briefly described. The α instructions (the format of the α instruction is illustrated in FIG. 11) are classified into an α₁ instruction and an α₂ instruction in accordance with the content of the operation code OP. The α₁ instruction designates data transfer between a register (part of the $GR_{0-15}$ 312) accessed by the destination register field GR and the graphic memory 114. On the other hand, the α₂ instruction designates data transfer between the graphic memory 114 and the program memory 113 accessed in accordance with the content of a register accessed by the field GR. The α₁ instructions include an MRG (Move GR to Graphic Memory) instruction and an MGR (Move Graphic Memory to GR). The α₂ instructions include an MUGN (Move n-Bytes UNIX Memory to Graphic Memory) instruction and an MGUN (Move n-Bytes Graphic Memory to UNIX Memory) instruction. Data transfer contents specified by these instructions are given as follows:

(1) MRG Instruction $$(GR) \rightarrow M(a \times 2^{16} + b + (IX))$$

According to the MRG instruction, the lower eight bits of the content of the register specified by the GR are transferred to the $(a \times 2^{16} + b + (IX))$ address of the graphic memory 114.

(2) MGR Instruction $$M(a \times 2^{16} + b + (IX)) \rightarrow GR$$

According to the MGR instruction, 8-bit data at the $(a \times 2^{16} + b + (IX))$ address of the graphic memory 114 is transferred to the lower eight bits of the register specified by the GR. In this case, the upper eight bits of the register are cleared.

MUGN Instruction         (3)

$$M(GR), M(GR + 1) \ldots M(GR + n - 1) \rightarrow M(a \times 2^{16} + b + (IX)),$$

$$M(a \times 2^{16} + b + (IX) + 1) \ldots M(a \times 2^{16} + b + (IX) + n - 1)$$

According to the MUGN instruction, the n-byte data in the program memory 113 which is started from the physical address corresponding to the address (i.e., the logical address requiring segment modification ) stored in the register accessed by the GR is transferred to an n-byte continuous memory area at addresses starting from the address $(a \times 2^{16} + b + (IX))$ of the graphic memory 114. During execution of the MUGN instruction, access of the program memory 113 by using the memory access data shown in FIG. 9 and access of the graphic memory 114 by using the memory access data shown in FIG. 12 are alternately performed. When the xth byte data is read out from the program memory 113, the address field has a sum of (x−1) and the content (GR) of the register accessed by the GR register.

MGUN Instruction         (4)

$$M(a \times 2^{16} + b + (IX)),$$

$$M(a \times 2^{16} + b + (IX) + 1) \ldots M(a \times 2^{16} + b + (IX) + n + 1) \rightarrow$$

$$M(GR), M(GR + 1) \ldots M(GR + n - 1)$$

According to the MUGN instruction, the n-byte continuous memory area data at addresses starting from the $(a \times 2^{16} + b + (IX))$ address of the graphic memory 114 is transferred to the program memory 113.

In the system shown in FIG. 1, an instruction is also prepared to DMA (Direct Memory Access) transfer graphic data from an external memory (not shown), such as a hard disk, to the graphic memory 114 by using a CCB (Channel Control Block) of the program memory 113 which represents the content of the register specified by the GR.

The graphic memory 114 can be accessed by the graphic display controller 115 upon the switching operation of the multiplexer 120 (and additionally the multiplexer 125). The graphic memory access by the graphic display controller 115 is performed in a time-division manner with that by the μP 101.

The present invention has been described with reference to the preferred embodiment. However, the present invention is not limited to this particular embodiment. Various changes and modifications may be made without departing from the spirit and scope of the invention. For example, the MMU 112 may comprise an independent memory having a memory area of 16 MB, and the first 1 MB area may be assigned to the UNIX area and the remaining memory area of 15 MB may be assigned to a graphic data area. In this case, the memory address line is commonly used for the UNIX and graphic memory areas, so that a selector must be used to select one of the memory areas in accordance with the logic level of the X bit. In addition, when the UNIX area address is selected, all "0" data "0000" must be linked with the MSB of the 20-bit data obtained by linking the output data (page frame number PFN) from the segment/page table 206 and the lower 10 bits (displacement DISP) of the memory access data. Furthermore, the upper operand address field a of the α instruction must be set to be higher than $2^4$ so as not to cause the graphic data area address to access the UNIX area. For this purpose, $2^4$ (=16) may be added to a when address calculation (index modification) is performed.

What is claimed is:

1. A 16-bit microprocessor system comprising:
   a memory having a basic address space for storing data and instructions and an expanded address space for storing data, said basic address space including a portion of a logical address space which consists of a plurality of paired segments assigned in units of a task, said portion being assigned to said basic address space in units of a page, each of said paired segments including a first segment for storing said data of said basic address space, and a second segment for storing said instructions of said basic address space, a least significant bit of a first segment number which is assigned to the first segment indicating a first logic value, a least significant bit of a second segment number which is assigned to the second segment indicating a second logic value, said second segment number being different by one from said first segment number;
   a 16-bit microprocessor including memory access data output means for producing memory access data for accessing said memory, said memory access data comprising a status field in which memory control data including first and second specific bits is set, an (n−16)-bit segment field, where n is an integer greater than 16, and a 16-bit address field having first and second fields, said first specific bit indicating an access to one of said basic address space and said expanded address space, said second specific bit designating an operand fetch when equal to said first logic value, and an instruction fetch when equal to said second logic value, said memory access data output means producing, during an operand fetch executed during execution of a first instruction having an n-bit first logical address, memory access data wherein: (a) said first specific bit of the status field is set to a logic value indicating an access to the expanded address space, (b) said second specific bit of the status field is set to said first logic value, (c) upper (n−16) bits of a first effective address corresponding to the first logical address are set in said segment field, and (d) remaining 16 bits of the first effective address are set in the address field, said memory access data output means producing, during an operand fetch executed during execution of a second instruction having a 16-bit second logical address, memory access data wherein: (a) said first specific bit of the status field is set at a logic value indicating an access to the basic address space, (b) said second specific bit of the status field is set at said first logic value, (c) a segment number is set in said segment field, (d) a page number in a 16-bit second effective address comprising a page number and displacement within the page is set in the first field of said address field, and the displacement in the second effective address is set in the second field of said address field, said memory access data output means producing, during an instruction fetch, memory access data wherein: (a) the first specific bit of the status field is set at a logic value indicating an access to the basic address space, (b) the second specific bit of the status field is set at the second logic value, (c) a segment number is set in the segment field, (d) a page number in a 16-bit third effective address comrpising a page number and displacement within the page is set in the first field of the address field, and (e) the displacement in the third effective address is set in the second field of the address field;

register means for holding memory access data output from the memory access data output means of said microprocessor;

a segment/page table, which is retrieved in accordance with data obtained by changing the segment field of the memory access data held by said register means, said changing effected by replacing the least significant bit of said segment field with the second specific bit of said memory access data, and by changing the first field of the address field of said memory access data, said segment/page table being accessed to generate page data; and selecting means for selecting one of said basic address space and said expanded address space in accordance with said first specific bit of said memory access data held by said register means, said basic address space being accessed in response to first address data obtained by linking the page data from said segment/page table and said second field of the address field of the memory access data, and said expanded address space being accessed in response to second address data obtained by linking the segment field and address field of said memory access data.

2. A 16-bit microprocessor system according to claim 1, wherein said first instruction comprises a half word having an operation code, a second half word having one of an upper (n−16)-bit logical address and lower 16-bit logical address which constitute the first logical address, and a third half word having the other of the upper and lower logical address.

3. A 16-bit microprocessor system according to claim 2, wherein said memory access data output means comprises:

index modification means, for performing index modification of the lower logical address of the first logical address in the operand fetch executed during execution of the first instrution, and for producing lower 16 bits of the first effective address;

flag means for storing a flag bit which indicates whether a carry is generated when index modification is performed by said index modification means; and means for adding the upper logical address of the first logical address and data stored in said flag means, and for producing upper (n−16) bits of the first effective address.

* * * * *